E. A. SPERRY.
ELECTRICAL AND GYROSCOPIC APPARATUS FOR TORPEDOES.
APPLICATION FILED NOV. 23, 1916.

1,314,157.

Patented Aug. 26, 1919.
3 SHEETS—SHEET 1.

INVENTOR
ELMER A. SPERRY.
BY
Herbert H. Thompson
ATTORNEY.

E. A. SPERRY.
ELECTRICAL AND GYROSCOPIC APPARATUS FOR TORPEDOES.
APPLICATION FILED NOV. 23, 1916.

1,314,157.

Patented Aug. 26, 1919.
3 SHEETS—SHEET 2.

WITNESSES:

INVENTOR
ELMER A. SPERRY.
BY
Herbert H. Thompson
ATTORNEY

E. A. SPERRY.
ELECTRICAL AND GYROSCOPIC APPARATUS FOR TORPEDOES.
APPLICATION FILED NOV. 23, 1915.

1,314,157.

Patented Aug. 26, 1919.

3 SHEETS—SHEET 3.

INVENTOR
ELMER A. SPERRY
BY
Herbert H. Thompson
ATTORNEY

UNITED STATES PATENT OFFICE.

ELMER A. SPERRY, OF BROOKLYN, NEW YORK, ASSIGNOR TO SPERRY GYROSCOPE COMPANY, A CORPORATION OF NEW YORK.

ELECTRICAL AND GYROSCOPIC APPARATUS FOR TORPEDOES.

1,314,157.   Specification of Letters Patent.   Patented Aug. 26, 1919.

Application filed November 23, 1916. Serial No. 132,995.

*To all whom it may concern:*

Be it known that I, ELMER A. SPERRY, a citizen of the United States, residing at 1505 Albemarle Rd., Brooklyn, in the county of Kings and State of New York, have invented certain new and useful Improvements in Electrical and Gyroscopic Apparatus for Torpedoes, of which the following is a specification.

This invention relates to electrical and gyroscopic apparatus for torpedoes, although many features of the invention have a much broader field of application.

As set forth in my co-pending application for gyroscopic apparatus for torpedoes, Serial No. 84,292, filed March 15, 1916, I find it desirable to provide in addition to a steering gyroscope, a gyroscope for stabilizing the torpedo. One of the main objects of the invention is to improve upon the apparatus set forth in the aforesaid application. One of the principal results secured is the elimination of the effect of centrifugal turning forces on the stabilizing gyroscope. In all dirigible vessels such as aeroplanes, torpedoes and the like, large acceleration pressures of this character are encountered, which, acting on the pendulous mass of the stabilizing gyroscope cause serious deviation of the gyroscope. Another object of the invention is to improve upon the present system of igniting the compressed gases used to drive the torpedo. Other objects will be apparent from the following description :—

Figure 1:
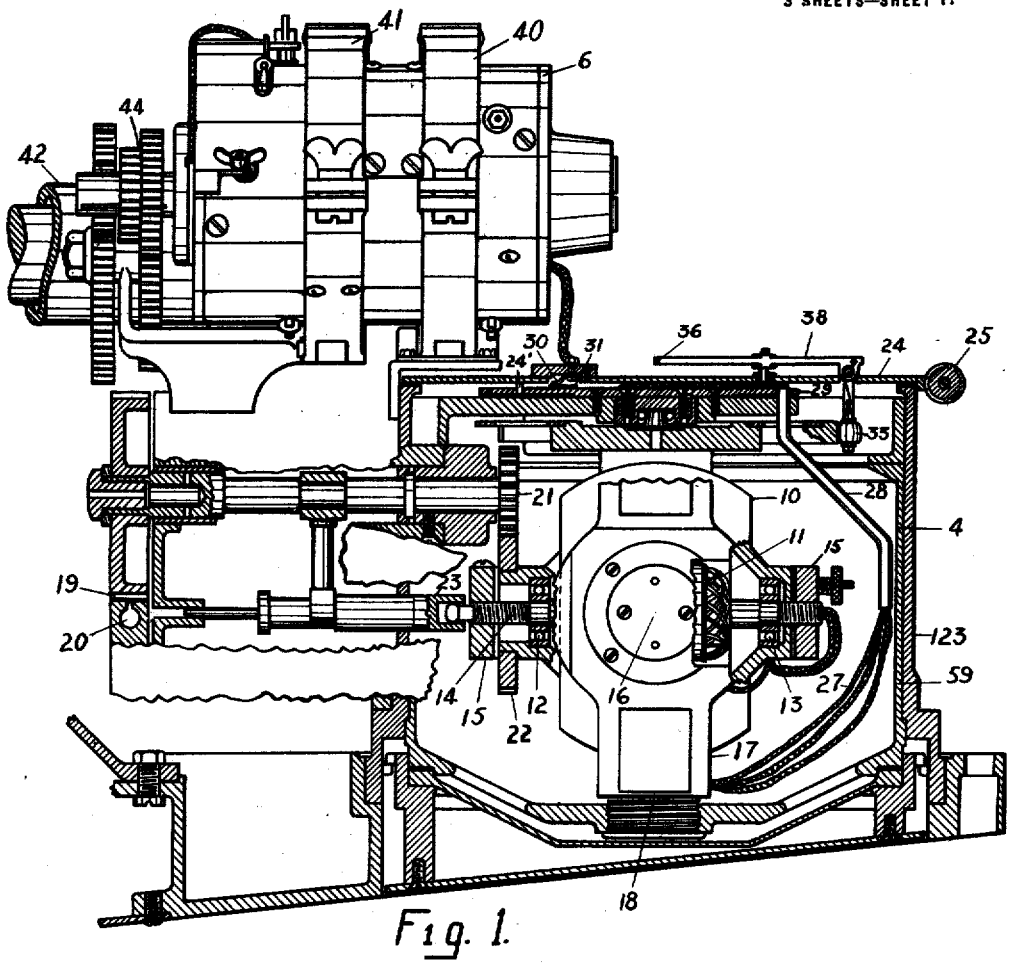
Figure 2:
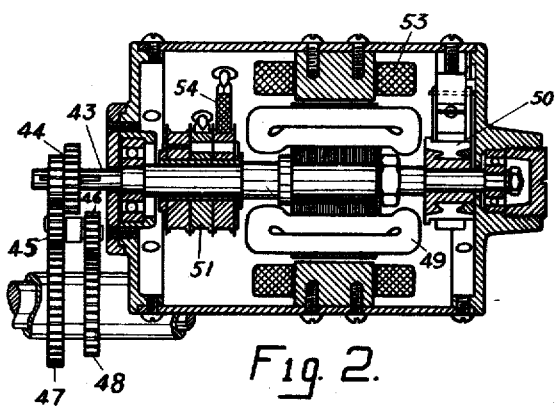
Figure 3:
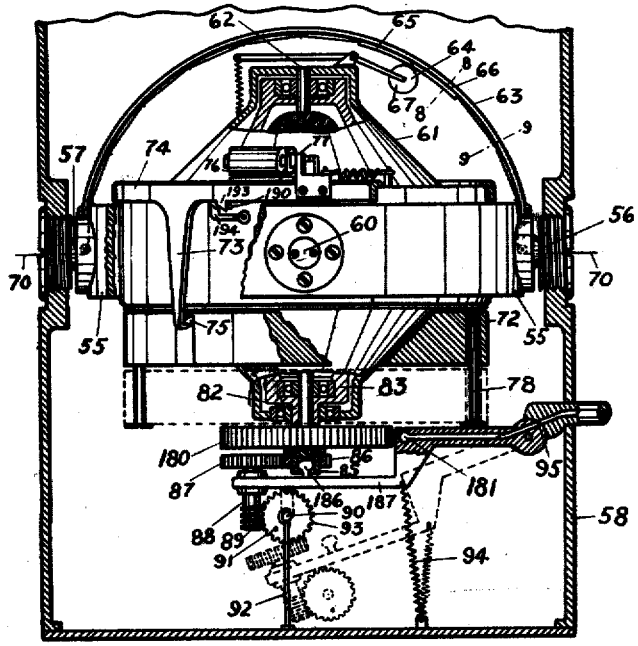
Figure 8:
Figure 9:
Figure 4:
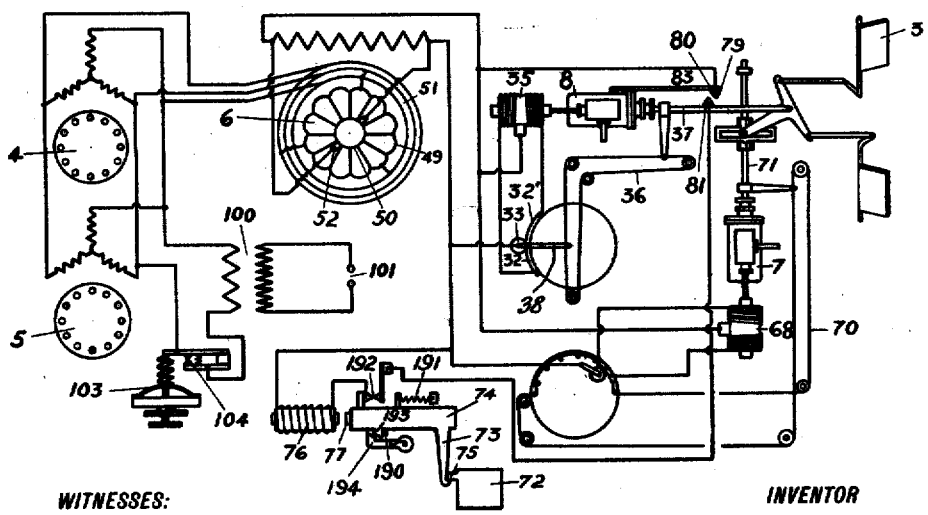
Figure 5:
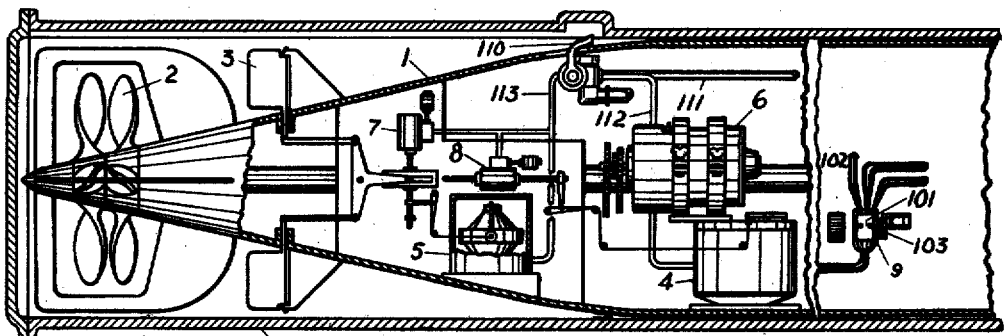
Figure 6:
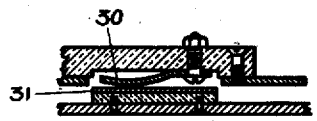
Figure 7:
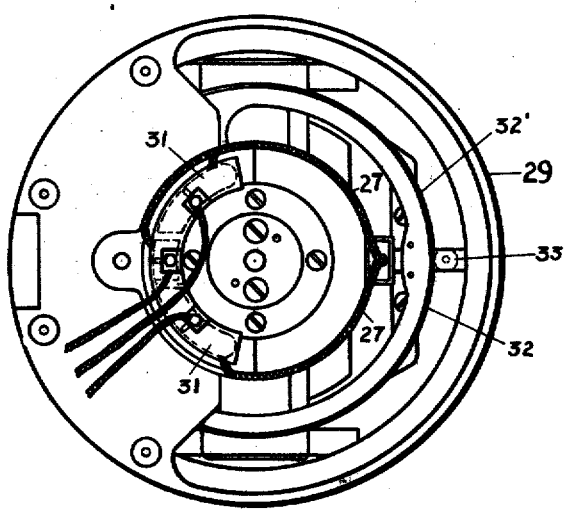
Figures 10, 11:
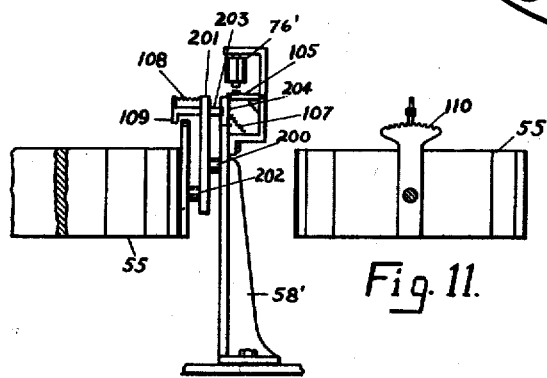

Referring to the drawings in which, what I now consider to be preferred forms of my invention are shown, Figure 1 is a vertical section through the steering gyroscope showing in elevation the small electric generator used for driving said gyroscope and for furnishing current for various other purposes within the torpedo. Fig. 2 is a horizontal section of said generator. Fig. 3 is a vertical section of the gyroscope used for stabilizing the torpedo. Fig. 4 is a diagram illustrating the electrical and mechanical connections between the principal elements of the invention. Fig. 5 is a longitudinal section on a smaller scale of the torpedo. Fig. 6 is a detail of a portion of the steering gyroscope, Fig. 7 is a plan view thereof, the top plate being removed for the sake of clearness. Fig. 8 is a section on line 8—8 Fig. 3. Fig. 9 is a section on line 9—9 of the same figure. Figs. 10 and 11 show a modified form of stabilizing gyroscope.

In Fig. 5 the torpedo launching tube is shown at T, the torpedo shell at 1, and the usual propellers and rudders at 2 and 3 respectively. Within the rear portion of the torpedo is shown the gyroscopic steering unit 4, the stabilizing unit 5, and the small generator 6, used for driving both the said gyroscopes or at least for maintaining their spin during the run of the torpedo. The steering engines 7 and 8 are also mounted in this portion of the torpedo, and are represented more or less diagrammatically in this view in order to show them clearly. Forward of these parts is shown an electric igniter 9 for the propelling fluids, the generator 6 preferably serving also to operate said igniter.

The steering gyroscope 4 (see Fig. 1) may comprise any suitable construction, but is preferably in the form of an electric motor, such as disclosed in my aforesaid co-pending application or in my application for gyroscopic apparatus for torpedoes Serial No. 47550 filed August 26, 1915. The gyroscope is shown as comprising a fly wheel 10, forming a rotor of an induction motor and inclosing the stator 11. Said rotor is shown as journaled by means of bearings 12, 13 on shaft 14 which supports the stator, and which extends across the horizontal gimbal ring 15. Said ring is in turn journaled on horizontal axes 16 within the vertical ring 17, said ring being journaled upon a vertical axis 18 in the usual manner. For spinning up the gyroscope during the launching operation I prefer to make use of the usual starting and locking mechanism such as illustrated by turbine wheel 19, nozzle 20, gears 21, 22 and locking bolt 23. It should be understood that said mechanism is withdrawn or shut off in some manner as the torpedo leaves the tube, for instance, by a latch which is struck, or after the gyroscope has completed a predetermined number of revolutions.

Rotatably mounted on the frame work 123 above the gyroscope is a plate 24 adapted to be set for angle firing as by means of worm 25. The wires 27 by means of which current is led into the motor are preferably connected in some manner with said rotatable plate so that the wires will hang vertically after the torpedo has straightened upon its course. For this purpose the wires may be led through a second plate 29 attached to the removable gyroscopic unit and detachably connected in some manner to plate 24 as by pin 24'. In order to complete an electric circuit from the generator 6 to the wires 27 attached to said plate 29, plate 24 is provided with flexible brushes 30, and plate 29 with contact strips 31.

The steering engines are preferably controlled from said gyroscope by means of electric contacts 32 and 32' connected to the gyroscope and a trolley 33 or the like on some portion of plate 24 so that turning of the torpedo about its vertical axis will cause trolley 33 to contact with one or the other of said contacts. Steering engine 8 is controlled from a solenoid 35 in circuit with said contacts.

Preferably, a follow-up connection from the steering engine to the contacts is provided. This may consist of a flexible member 36 connected to the piston rod 37 of the steering engine and also to lever 38 bearing trolley 33. Said lever is pivotally mounted on plate 24 so as to be affected by both the turning of the torpedo and the rudder, and also so that the trolley may be set for angle fire. The generator 6 is preferably detachably secured adjacent the gyroscopic unit as by means of clamps 40, 41. It is preferably driven from the main power source within the torpedo as by being geared directly to the propeller shaft 42.

Since torpedoes are adapted to be propelled at different speeds I prefer to provide change speed gearing between the generator and propeller shaft so that the speeds of the generator may be kept approximately constant. For this purpose the generator shaft 43 is provided with a pair of slidable gears 44 which may be brought into mesh with either one or the other of idlers 45, 46, which mesh with gears 47, 48, respectively on the propeller shaft.

For the purpose of securing a compact, efficient electrical power source for all of the various purposes for which I propose to employ electricity within the torpedo I have devised a novel form of miniature A. C.-D. C. generator. This comprises preferably a single armature winding 49 having both a D. C. commutator 50 and A. C. collector rings 51. The commutator segments are connected at spaced portions to the continuous winding 49 in the manner diagrammatically indicated in Fig. 4, while the slip rings are also connected to other spaced portions of said windings.

Current from the D. C. brushes 52 is utilized for exciting the field 53 and also preferably for operating the steering and stabilizing engine solenoids. The polyphase current from the slip rings 51 is utilized to drive the induction motors of gyroscopes 4 and 5 and also preferably for the igniter 9.

Turning now to the preferred details of the stabilizing gyroscope 5 reference is had to Fig. 3, wherein the gyroscope is shown as comprising a member or ring 55 pivotally mounted on horizontal trunnions 56, 57, in frame work 58, which may form the walls of the detachable gyroscopic unit in a manner similar to walls 59 of the detachable steering unit 4. It should here be observed that the type of stabilization which it is proposed to employ is not the same as employed to stabilize ships, in which what may be termed direct stabilization is employed. In ships the gyroscopic reactions of the gyroscopes are applied directly to the ships. According to the present system, however, which also has especially application to aeroplanes, the gyroscope is employed merely to establish a base line from which the torpedo is stabilized through a servo-motor. By this system the size and weight of the gyroscope may be greatly lessened. Preferably axis 56, 57 of the gyroscope is placed athwartships. Mounted within said ring 55 on horizontal axis 60 which preferably extends in a fore and aft direction, is the rotor bearing frame 61 within which the rotor is journaled preferably on the vertical spinning axis 62. Means are provided which are brought into action by relative inclination of the torpedo and gyroscope about the fore and aft axis for stabilizing the torpedo. For this purpose a member or loop 63 may be secured to ring 55 so as to extend parallel to axis 56, 57, and a coöperating member 64 secured to frame 61. By locating these members within the gimbal ring, I secure the advantage that pitching of the torpedo will not disturb them, since loop 63 is stabilized about axis 56, 57. These members may assume the form of reversing contacts 65, 66 on loop 63 and a coöperating spring pressed trolley 67 on the frame. Said contacts are in circuit with solenoid 68 which controls the stabilizing engine 7 in the manner described in connection with the steering engine. A follow-up connection may also be provided from the stabilizing engine to said contacts. For this purpose the flexible member 70 secured to piston rod 71 of engine 7 may extend through the pivots 56, 57 around the ring 63 over pulleys 69' shown in Fig. 9, and be connected to the block 65' which supports the contacts 65, 66. Said block is guided in trackway 69 as shown in Fig. 8.

From the above description it will be apparent that I prefer to provide the stabilizing gyroscope with three degrees of freedom. I also find it preferable to make the gyroscope pendulous about either or both horizontal axes in order to maintain a fixed reference plane. During angle firing, however, the acceleration pressures acting on the gyroscope would tend to cause undesirable precession and oscillation of the gyroscope due to its pendulosity which would seriously affect the subsequent operation of the torpedo. In order to overcome this effect, I prefer to provide means whereby the gyroscope is maintained in a perfectly balanced or only slightly pendulous condition while it is turning through the initial angle, while it is rendered pendulous or its degree of pendulosity increased as soon as or shortly after it has started upon the final course. To this end the center of gravity of the gyroscope may be shifted as by attaching to the rotor bearing frame 61 or to some other portion of the gyroscope a movable weight 72. Said weight is normally held in the full line position shown in Fig. 3 by means of hooks 73 which extend downwardly from ring 74 mounted on casing 61 and engage lugs 75 on said weight. Also secured to said frame is an electromagnetic means 76, which, upon being excited attracts an armature 77 secured to said ring thereby rotating it and releasing the weight which drops into the dotted line position in Fig. 3 in which position it is supported by bolts 78 or the like extending from said frame. For operating said means a contact 79 or the like may be provided which is so arranged as to actuate said means to release the weight as soon as the rudders 3 reach the position in line with the fore and aft line of the torpedo; in other words, as soon as the torpedo's course becomes a straight line. One part of the contact 80 may be fixed while the coöperating part 81 is located on some moving portion of the steering engine or connections such as piston rod 37. In order to prevent a waste of electrical energy in maintaining the excitation of magnet 76 after the dropping of weight 72, means are provided to keep the circuit leading to said magnet broken, as follows: When ring 74, which is normally held in position against pin 190 by means of spring 191, is rotated by the magnet to release the weight, electric contact 192 is broken, and lug 193 passes over catch 194 and prevents ring 74 from returning to its original position thus maintaining contact 192 in an open position.

While the stabilizing gyroscope may be started electrically, I prefer to spin it up during the launching operation, so that the torpedo may be placed in the tube and fired without preliminary preparation or adjustment. A compressed air or turbine starting device may be employed which is shut off at or about the time the torpedo takes the water. In connection therewith I also provide a locking bolt to lock the gyroscope during the spinning up operation. The preferred form of such mechanism consists of a turbine wheel 180 and a nozzle 181 therefor. Said wheel may be mounted directly on a sleeve 82 extending from the rotor 83. The fixed shaft 62 which supports the stator is extended to form one portion 85 of a two-part locking bolt. The other portion 186 may be secured to an extension 187 from nozzle 181. For turning off the nozzle and withdrawing the locking bolt, I prefer to provide means operable by the completion by the gyroscope of a predetermined number of revolutions. For this purpose a pinion 86 is secured to wheel 180 and meshes with a gear 87 mounted on the shaft 88 of the worm 89. Said worm meshes with worm wheel 93 which carries a pin 91 adapted to strike during its rotation a flexible or hinged supporting member 92 which engages a pin or lug 90 secured to arm 87 and thereby acts to support the nozzle and locking bolt in the full line position shown. When pin 91 strikes member 92 however, the support is withdrawn and the nozzle and bolt rotated downwardly by means of spring 94. Preferably the inlet 95 of the rotatable nozzle is so arranged as to shut off the air supply by its rotation, so that both the locking bolt and nozzle are withdrawn and the air supply shut off in one operation.

As stated above, I prefer to employ the generator 6 also for igniting the propelling fluids. The A. C. side of the generator is connected to the low tension side of a small transformer 100, the high tension side being connected to a spark gap 101 located in the ignition chamber 9. In order to shut off the sparks after the fuel is burning properly, I may provide a thermostat 103 located adjacent said chamber which will open switch 104 so that the transformer circuit will be opened. By this device I supply a positive means which will maintain an igniting flame or sparks until the fuel is ignited, and which will also relight or keep the fuel ignited, as the contact 104 is broken only while the fuel is burning.

The operation of my invention is, briefly, as follows: As the torpedo is fired from the tube T, the catch 110 is struck which opens the air or fuel supply valve from which pipes 111, 112, 113, lead to the driving engine, gyroscope 4 and gyroscope 5, respectively, and also to steering engines 7 and 8. Both gyroscopes attain their predetermined speed in a fraction of a second, when their respective shut off mechanism operates, unlocks the gyroscopes and shuts off the air supply to the gyroscopes. At the same time, the driving engine and generator 6 have been brought up to speed, so that each gyroscope will be maintained at, or if desired, accelerated above its initial speed throughout the run of the torpedo. A steady stream of sparks will also be maintained across gap 101 in chamber 9 until they are shut off by the thermostat 103. If the torpedo has been set for angle fire by turning plate 24, the weight 72 will be held in its elevated position until the rudders turn straight, when contact 79 will be completed and the weight dropped so that the gyroscope will become decidedly pendulous.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Thus methods other than lowering a weight on the gyroscope may be employed to alter its pendulosity or degree of pendulosity within the scope of this invention. For instance, I may shift the effective axis of support of the gyroscope by means such as indicated in Figs. 10 and 11 or by equivalent means.

The support for the gyroscope is represented at 58'. On said support is pivotally mounted on horizontal axis 200 a member 201. The gyroscope or a portion thereof such as gimbal ring 55 is pivotally connected to said member 201, by pivot 202 above or below said axis 200. Means are provided to shift the effective supporting axis from one pivot to another by alternately locking the member 201 to said support and said gimbal ring. This means may consist of a sliding bolt 203 which is normally held in the position shown in Fig. 10 by means of a hinged plate 204 against which latch 105 normally bears. The bolt is adapted to engage a recess in plate 204 so as to firmly lock member 201 to the support. Upon the excitation of magnet 76' the latch 105 is lifted releasing plate 204 so that it is drawn down by spring 107. This it will be seen will release bolt 203 and allow it to be retracted by spring 108, thus drawing the detent 109 on the end of the bolt into engagement with the serrations 110 on the gimbal ring 55. Magnet 76' may be placed in circuit with contact 192 similarly to magnet 76.

Having described my invention, what I claim and desire to secure by Letters Patent is:

1. In a torpedo, a stabilizing means for stabilizing about a horizontal axis thereof comprising a gyroscope mounted therein and means for spinning up said gyroscope at the time of launching.

2. In a torpedo, a stabilizing means for stabilizing about a horizontal axis thereof comprising a gyroscope mounted therein, means for spinning up said gyroscope at the time of launching, and a generator driven by the torpedo driving engine for maintaining said pin.

3. The combination with a torpedo, of a stabilizing gyroscope and a steering gyroscope therefor, and means for spinning up said gyroscopes during the launching operation.

4. The combination with a torpedo, of a stabilizing gyroscope and a steering gyroscope therefor, external means brought into action by said gyroscope for stabilizing and steering the torpedo, and means for spinning up said gyroscopes during the launching operation.

5. The combination with a torpedo, of a stabilizing gyroscope therefor, external means brought into action by said gyroscope for stabilizing the torpedo about a horizontal axis, and means for spinning up said gyroscope during the launching operation.

6. In a dirigible device the combination with a stabilizing gyroscope, of means for varying the pendulosity of said gyroscope in accordance with the character of the course in which the device is steered.

7. In a dirigible device, a gyroscope supported thereon with three degrees of freedom, means controlled from said gyroscope for stabilizing said device, and means for rendering said gyroscope more pendulous when the device is on a straight course than when the latter is turning.

8. In a dirigible device, a gyroscope supported thereon with three degrees of freedom, means controlled from said gyroscope for stabilizing said device, and means for varying the pendulosity of said gyroscope.

9. In a dirigible device, a gyroscope supported thereon with three degrees of freedom, means controlled from said gyroscope for stabilizing said device, means for steering said device, and means for varying the pendulosity of said gyroscope in accordance with the position of said steering means.

10. In combination, a torpedo, a gyroscope for controlling stabilization about a horizontal axis and normally having three degrees of freedom, a locking means for said gyroscope, a mechanical spinning up mechanism therefor, and automatic means for withdrawing said locking means.

11. In combination, a torpedo, a gyroscope for controlling stabilization about a horizontal axis and normally having three degrees of freedom, a locking means for said gyroscope, a mechanical spinning up mechanism therefor, and automatic means for withdrawing said locking means and for rendering said mechanism inoperative.

12. In a torpedo, the combination of a gyroscope having freedom about a horizontal axis, and means for varying the pendulosity thereof during the run of the torpedo.

13. In a torpedo adapted for angle firing, the combination of a gyroscope having freedom about a horizontal axis, and means for increasing the pendulosity thereof at about the time the torpedo straightens upon its course.

14. In a torpedo, a member mounted on an axis athwart the torpedo, a rotor bearing frame pivotally mounted therein on an axis at an angle to said other axis, a rotor journaled therein, and a two part device the parts of which are mounted respectively on said member and on said frame so as to be moved by the relative movement of said member and frame about said second axis, and means controlled by said device for stabilizing the torpedo.

15. In a torpedo, a stabilizing gyroscope, a Cardan mounting therefor having its minor axis fore and aft, and means brought into action by oscillation of said gyroscope about said minor axis for stabilizing the torpedo about an axis at an angle to the vertical.

16. In a torpedo, a member mounted on a horizontal axis, a rotor bearing frame pivotally mounted therein on a fore and aft axis, a rotor journaled therein, and a two part device the parts of which are mounted respectively on said member and on said frame so as to be moved by the relative movement of said member and frame about said second axis, and means controlled by said device for stabilizing the torpedo.

17. In a dirigible device, a gyroscope supported for oscillation about a horizontal axis, and means for altering the position of said axis with respect to the gyroscope.

18. In a dirigible device, a gyroscope supported thereon with three degrees of freedom, means controlled from said gyroscope for stabilizing said device, and means for varying the pendulosity of said gyroscope by altering the position of a pivotal support with respect to the gyroscope.

19. In a dirigible device, a gyroscope supported thereon with three degrees of freedom, means controlled from said gyroscope for stabilizing said device, and means for varying the pendulosity of said gyroscope comprising an operative and inoperative pivotal support for said gyroscope, and means for rendering said operative support inoperative and the other of said supports operative.

20. In a dirigible vehicle, a supporting device, a member pivotally mounted thereon on a horizontal axis, a gyroscope pivotally mounted on said member on an axis out of line with said other axis and means for changing the effective axis of support from one axis to the other.

21. In a dirigible vehicle, a supporting device, a member pivotally mounted thereon on a horizontal axis, a gyroscope pivotally mounted on said member on an axis out of line with said other axis, and means for locking said member to said supporting device.

22. In a dirigible vehicle, a supporting device, a member pivotally mounted thereon on a horizontal axis, a gyroscope pivotally mounted on said member on an axis out of line with said other axis and means for locking said member to said gyroscope.

23. In a dirigible vehicle, a supporting device, a member pivotally mounted thereon on a horizontal axis, a gyroscope pivotally mounted on said member on an axis out of line with said other axis, said member being normally locked to one of said devices and means for causing said member to become unlocked from said device and locked to said other device.

24. In combination, a dirigible vehicle, a universally mounted gyroscope for controlling said vehicle and means for varying the pendulosity of said gyroscope after said vehicle has been launched.

25. In combination, a dirigible vehicle, a universally mounted gyroscope for controlling said vehicle and means for changing the distance between the center of gravity and virtual point of support of said gyroscope after said vehicle has been launched.

26. In combination, a dirigible device, a universally mounted gyroscope carried by said device and means for shifting the virtual point of support of said gyroscope with respect to said device upon the happening of a predetermined event.

27. In a spinning up mechanism for torpedo gyros, a gyro-rotor, a turbine wheel connected thereto, a nozzle normally in operative relationship with respect to said wheel and means responsive to the number of revolutions of said rotor for moving said nozzle away from said wheel.

28. In combination, a dirigible vehicle, a universally mounted gyroscope for controlling said vehicle and means for varying the pendulosity of said gyroscope upon the happening of a predetermined event.

29. In combination, a torpedo comprising a propelling shaft, a gyroscope within said torpedo, a casing for said gyroscope and a generator for supplying driving energy to said gyroscope, said generator being carried by said casing and operatively connected to said shaft.

30. A torpedo-steering unit comprising in combination, a gyroscope, an electric motor for driving the rotor of said gyroscope, a casing in which said gyroscope and its motor are mounted, an electric current-supplying generator for said motor secured to said casing and an element on the shaft of said generator adapted to be operatively connected to the propelling mechanism of a torpedo when the unit is mounted therein.

In testimony whereof I have affixed my signature.

ELMER A. SPERRY.

Copies of this patent may be obtained for five cents each, by addressing the "Commissioner of Patents, Washington, D. C."